(12) United States Patent
Beers et al.

(10) Patent No.: US 9,878,793 B2
(45) Date of Patent: Jan. 30, 2018

(54) COOLING AIR SUPPLY CONTROL SYSTEM FOR AIR CYCLE MACHINE

(71) Applicant: HAMILTON SUNDSTRAND CORPORATION, Windsor Locks, CT (US)

(72) Inventors: Craig M. Beers, Wethersfield, CT (US); Darryl A. Colson, West Suffield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 359 days.

(21) Appl. No.: 14/598,315

(22) Filed: Jan. 16, 2015

(65) Prior Publication Data

US 2016/0207629 A1  Jul. 21, 2016

(51) Int. Cl.
*B64D 13/06* (2006.01)
*F02C 6/08* (2006.01)
(Continued)

(52) U.S. Cl.
CPC ............. *B64D 13/06* (2013.01); *F02C 6/08* (2013.01); *F02C 7/06* (2013.01); *F25B 9/004* (2013.01);
(Continued)

(58) Field of Classification Search
CPC ............ B64D 13/06; B64D 2013/0648; B64D 2013/0618; F16C 37/002; F16C 17/024; F16C 17/042; Y02T 50/671
See application file for complete search history.

(56) References Cited

U.S. PATENT DOCUMENTS 2,466,441 A * 4/1949 Keller ................... F02M 1/00
                                                         137/111
2,876,788 A * 3/1959 Shube ................... F16K 11/048
                                                         137/112
(Continued)

FOREIGN PATENT DOCUMENTS

EP  2602191  6/2013
EP  2620616  7/2013
WO  9409276  4/1994

OTHER PUBLICATIONS

International Search Report, International Application No./Patent No. 16150950.0-1607, dated Jun. 10, 2016, European Patent Office; International Search Report 9 pages.

*Primary Examiner* — Jason Shanske
*Assistant Examiner* — Jason T Newton
(74) *Attorney, Agent, or Firm* — Cantor Colburn LLP

(57) ABSTRACT

An air supply controller is configured to supply cooling air to an air cycle machine. The controller includes a chamber having a first inlet configured to receive air from a first source, a second inlet configured to receive air from a second source, and an outlet configured to pass air from first inlet and/or the second inlet to an air cycle machine. A control member is disposed within the chamber and configured to move from a first position to a second position. When the control member is in the first position it obstructs an airflow from the second inlet to the outlet and permits an airflow from the first inlet to the outlet. When the control member is in the second position it obstructs the airflow from the first inlet to the outlet and permits the airflow from the second inlet to the outlet.

10 Claims, 5 Drawing Sheets

(51) Int. Cl.
  *F02C 7/06* (2006.01)
  *F25B 9/00* (2006.01)
  *F25B 9/06* (2006.01)
  *F16C 37/00* (2006.01)
  *F16C 17/02* (2006.01)
  *F16C 17/04* (2006.01)

(52) U.S. Cl.
  CPC ...... *F25B 9/065* (2013.01); *B64D 2013/0618* (2013.01); *B64D 2013/0648* (2013.01); *F16C 17/024* (2013.01); *F16C 17/042* (2013.01); *F16C 37/002* (2013.01); *Y02T 50/671* (2013.01)

(56) References Cited

U.S. PATENT DOCUMENTS

| | | | | |
|---|---|---|---|---|
| 3,226,030 A | * | 12/1965 | Rossi | B60S 3/044 159/4.01 |
| 3,338,257 A | * | 8/1967 | Ferguson | F16K 11/0445 137/112 |
| 3,533,431 A | * | 10/1970 | Rainer | F15B 13/00 137/113 |
| 4,253,481 A | * | 3/1981 | Sarlls, Jr. | F16K 11/044 137/112 |
| 6,662,819 B1 | * | 12/2003 | Watson | F17C 13/045 137/113 |
| 2010/0092116 A1 | | 4/2010 | Franconi | |
| 2010/0154896 A1 | * | 6/2010 | Thrash, Jr. | F16K 11/044 137/112 |

* cited by examiner

COOLING AIR SUPPLY CONTROL SYSTEM FOR AIR CYCLE MACHINE

BACKGROUND OF THE INVENTION

The subject matter disclosed herein relates to an air cycle machine and, more particularly, to a cooling air supply control system for an air cycle machine.

Conventional aircraft environmental control systems (ECSs) incorporate an air cycle machine, also referred to as an air cycle cooling machine, for use in cooling and dehumidifying air for an aircraft cabin. Such air cycle machines may include two or more wheels disposed at axially spaced intervals along a common shaft. The wheels are part of, for example, a compressor rotor, a turbine rotor, a fan rotor, an additional turbine rotor, or an additional compressor rotor. In some cases the turbine or turbines drive both the compressor and the fan.

On aircraft powered by turbine engines, the air to be conditioned in the air cycle machine is typically compressed air bled from one or more of compressor stages of the turbine engine. In conventional systems, this bleed air passes through the air cycle machine compressor where it is further compressed. The compressed air is passed through a heat exchanger to cool the compressed air sufficiently to remove moisture and dehumidify the air. The dehumidified compressed air is expanded in the turbine of the air cycle machine to both extract energy from the compressed air so as to drive the shaft and also to cool the expanded turbine exhaust air before it is supplied to the aircraft cabin as conditioned cooling air.

A flow path of an air cycle machine can also include a heat exchanger cooling flow that draws air through the heat exchanger, past a fan rotor, and dumps the flow into an overboard duct. The fan rotor can be used to establish the flow when insufficient ram air is available to draw air through the heat exchanger.

Bearings are used and employed within air cycle machines. As the air cycle machine operates, the bearings will heat up. The heat can lead to damage to the bearings or to other components of the air cycle machine. Thus, bearing cooling air is fed into the air cycle machine for the purpose of maintaining operational temperatures for the bearings i.e., relatively cool temperatures.

Hydrodynamic fluid film journal bearings, also called journal air bearings or foil bearings, can be used to provide support to rotatable components such as shafts. A typical journal bearing may include a journal sleeve, a bump foil, an intermediate foil, and a top foil. During operation, rotation of the rotatable component causes a working fluid to form a cushion (often referred to as an "air bearing") that supports the rotatable component with little or no direct contact between the rotatable component and the foils of the bearing. Journal bearings provide fluid cushions for radial loads.

Similarly, hydrodynamic fluid film thrust bearings generate a lubricating non-linear air film between a portion of a rotating shaft or other rotatable component and the bearing. One typical bearing arrangement utilizes welded subassemblies. A top subassembly includes an annular main plate having multiple arcuate, corrugated foils welded to the main plate. A corresponding number of arcuate top foils are supported by bump foils. A bottom subassembly includes another annular main plate having multiple arcuate bump foils welded to the main plate. Thus, during operation, rotation of the rotatable component or shaft causes a working fluid to form in and around the corrugated foils to provide an air bearing. The bump foils provide a desired spring rate to cushion the rotatable component as the shaft moves axially. Thus, thrust bearings provide fluid cushions for axial loads.

During operation, the bearings may be rotated at high speeds which result in heat generation. The heat can lead to failure of the bearings by compromising the structural integrity of the components of the bearings. To reduce the risk of failure of the bearings, cooling air is conveyed and passed over bearing surfaces to remove the heat from the bearing.

Traditionally, the bearing cooling flow is supplied from a single high pressure, cool temperature source. For example, the bearing cooling flow is traditionally sourced from the turbine inlet of the air conditioning system, with the source of the air to the air conditioning system a compressor stage of the engine of the aircraft. Check valves may be used to close the cooling air inlet to close the bearing cooling circuit in order to reduce leakage and impact system efficiency when the air cycle machine is not running, effectively shutting off the cooling air supply when not in use.

BRIEF DESCRIPTION OF THE INVENTION

According to one aspect of the invention, an air supply controller is configured to supply cooling air to an air cycle machine, the controller including a chamber having a first inlet configured to receive air from a first source, a second inlet configured to receive air from a second source, and an outlet configured to pass air from at least one of the first inlet and the second inlet to an air cycle machine, and a control member disposed within the chamber and configured to move within the chamber from a first position to a second position. When the control member is in the first position the control member obstructs an airflow from the second inlet to the outlet and permits an airflow from the first inlet to the outlet, and when the control member is in the second position the control member obstructs the airflow from the first inlet to the outlet and permits the airflow from the second inlet to the outlet.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The present invention, in general, provides a control system for providing a cooling air flow to hydrodynamic fluid film bearing assemblies. The control system provides, in some embodiments, a simple control member design with no actuators, motors, or other types of controls, although in some embodiments such operational features may be included without departing from the scope of the invention, and may be included depending on the requirements or design of a particular air cycle machine. Further, the control systems and methods disclosed herein can be employed in existing air cycle machines without substantial modification.

Figure 1:
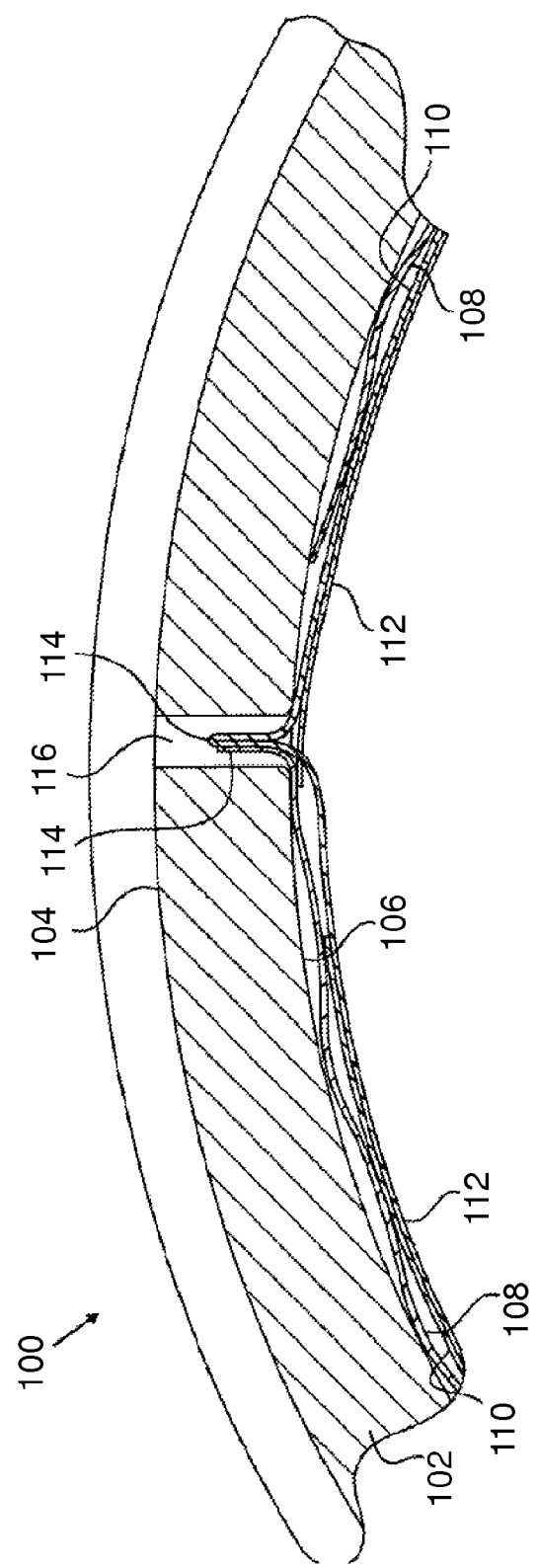
FIG. 1 is a partial cross-sectional view of an exemplary journal bearing.

FIG. 1 is a cross-sectional view of an exemplary hydrodynamic fluid film journal bearing assembly ("journal bearing 100"), which represents one type of foil hydrodynamic bearing that may employ embodiments of the invention. The journal bearing 100 includes a journal sleeve 102 that defines an outer diameter surface 104 and an inner diameter surface 106. The journal sleeve 102 is substantially cylindrical and is arranged about a central axis. It should be noted that the journal sleeve can have a conventional cylindrical shape, or can be shaped with a weight-reduced profile, or configured as other shapes or configurations, and FIG. 1 merely presents an exemplary configuration of a journal bearing 100.

In FIG. 1, a number of foils are arranged inside the journal sleeve 102. The journal bearing 100 includes a bump foil 108, an intermediate foil 110, and a top foil 122. The bump foil 108, the intermediate foil 110, and the top foil 112 are each formed from thin sheets of material (e.g., nickel-based alloys, steel, or similar materials) wrapped in a generally cylindrical shape and positioned in a bore of the journal sleeve 102. The bump foil 108 is corrugated, allowing a working fluid and/or cooling fluid to flow through the spaces formed between adjacent corrugations. The bump foil 108 is positioned adjacent to the inner diameter surface 106 of the journal sleeve 102. The foils 108, 110, and 112 are retained relative to the journal sleeve 102 with bent portions 114 that engage a key slot 116.

A rotatable component like a shaft (not shown) can be positioned inside the journal bearing 100, radially inward from the top foil 112. A radially inner surface of the top foil 112 exposed to the rotatable component can optionally be coated with a suitable dry film lubricant. Use of such a dry film lubricant can reduce friction caused by the rotatable component contacting the top foil 112 when accelerating to operating speed, when decelerating from operating speed, when stopped, and when subject to incidental contact with the top foil 122 during regular operation. Even with the application of a dry film lubricant, during operation heat is generated on the surfaces of the foils 108, 110, and 112 of journal bearing 100, which can lead to structural failure of the journal bearing 100. Accordingly, moving air is passed over the surfaces of the journal bearing 100 to remove the heat and prevent the journal bearing 100 from overheating and failing. However, under atypical system operation, loads exceeding bearing capacity will be imposed on a bearing leading to an associated increase in bearing cooling flow temperature and bearing failure.

Figure 2:
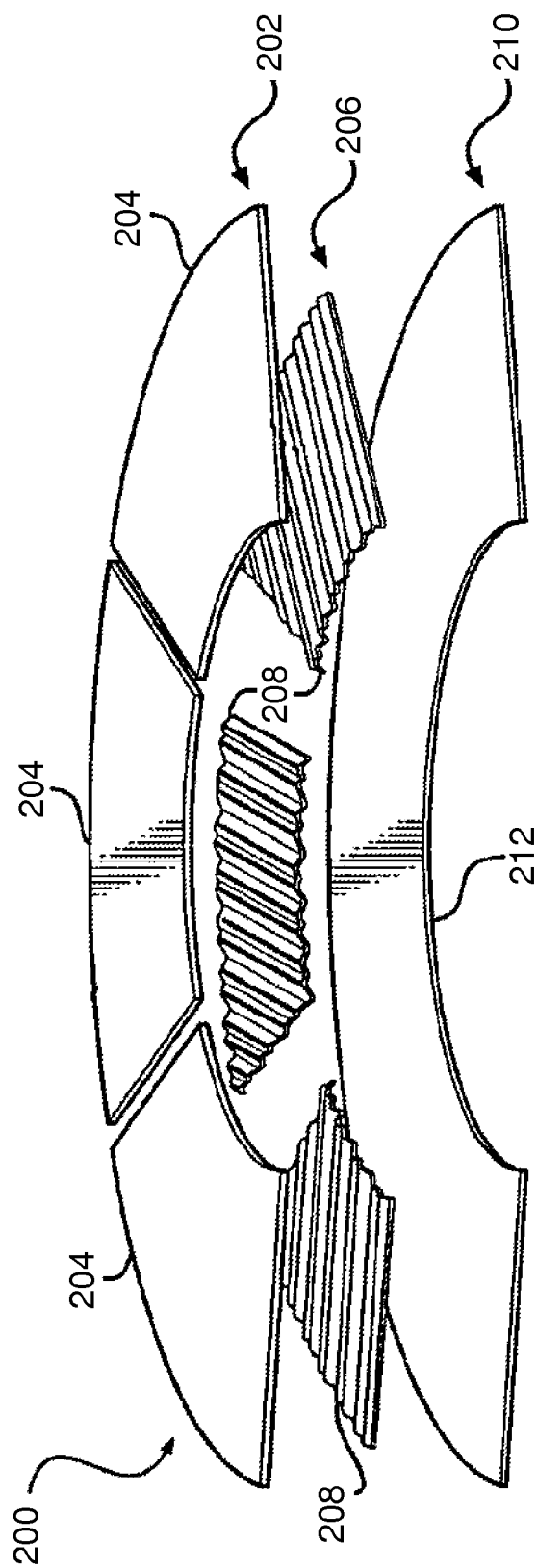
FIG. 2 is a partial exploded view of an exemplary thrust bearing.

Now referring to FIG. 2, an exploded view of an exemplary hydrodynamic fluid film thrust bearing assembly ("thrust bearing 200"), which represents another type of foil hydrodynamic bearing that may employ embodiments of the invention, is shown. The thrust bearing 200 of FIG. 2 has a different construction than the journal bearing 100 of FIG. 1. This is because journal bearings, such as shown in FIG. 1, operate with radial loads, whereas thrust bearings, as shown in FIG. 2, operate with axial loads. However, both types of bearings operate similarly by employing hydrodynamic fluid films, such as air or other fluids, to both provide bearing lubricant and cooling flows to prevent overheating.

The thrust bearing 200 includes three layers, but may include more or fewer layers. A first layer 202 comprises multiple arcuate top foils 204 that are spaced circumferentially relative to one another about a central axis. The top foils 204 are supported by a second layer 206 having a corresponding number of arcuate bump foils 208 arranged circumferentially beneath the top foils 204. The bump foils 208 are corrugated to provide cushioning and accommodate a cooling airflow through the thrust bearing 200. A third layer 210 is provided as an annular main plate 212 that supports the bump foils 208. Similar to a journal bearing, the top foils 204 of the thrust bearing may be coated in a dry film lubricant. The three layers 202, 206, and 210 may be secured to one another, for example, by spot welding.

Similar to the journal bearing 100 of FIG. 1, moving air is passed over the surfaces of the thrust bearing 200 to remove the heat and prevent the thrust bearing 200 from overheating and failing. However, again, under atypical system operation, loads exceeding bearing capacity will be imposed on a bearing leading to an associated increase in bearing cooling flow temperatures and to bearing failure.

The above described hydrodynamic bearings can be employed in air cycle machines of aircraft. The hydrodynamic bearings provide a long lasting bearing with minimal to no required maintenance. This is because the bearings employ air as both a lubricating fluid and as a cooling fluid. This means that no lubricating or cooling liquids, such as oils, need to be replaced over time.

Figure 3:
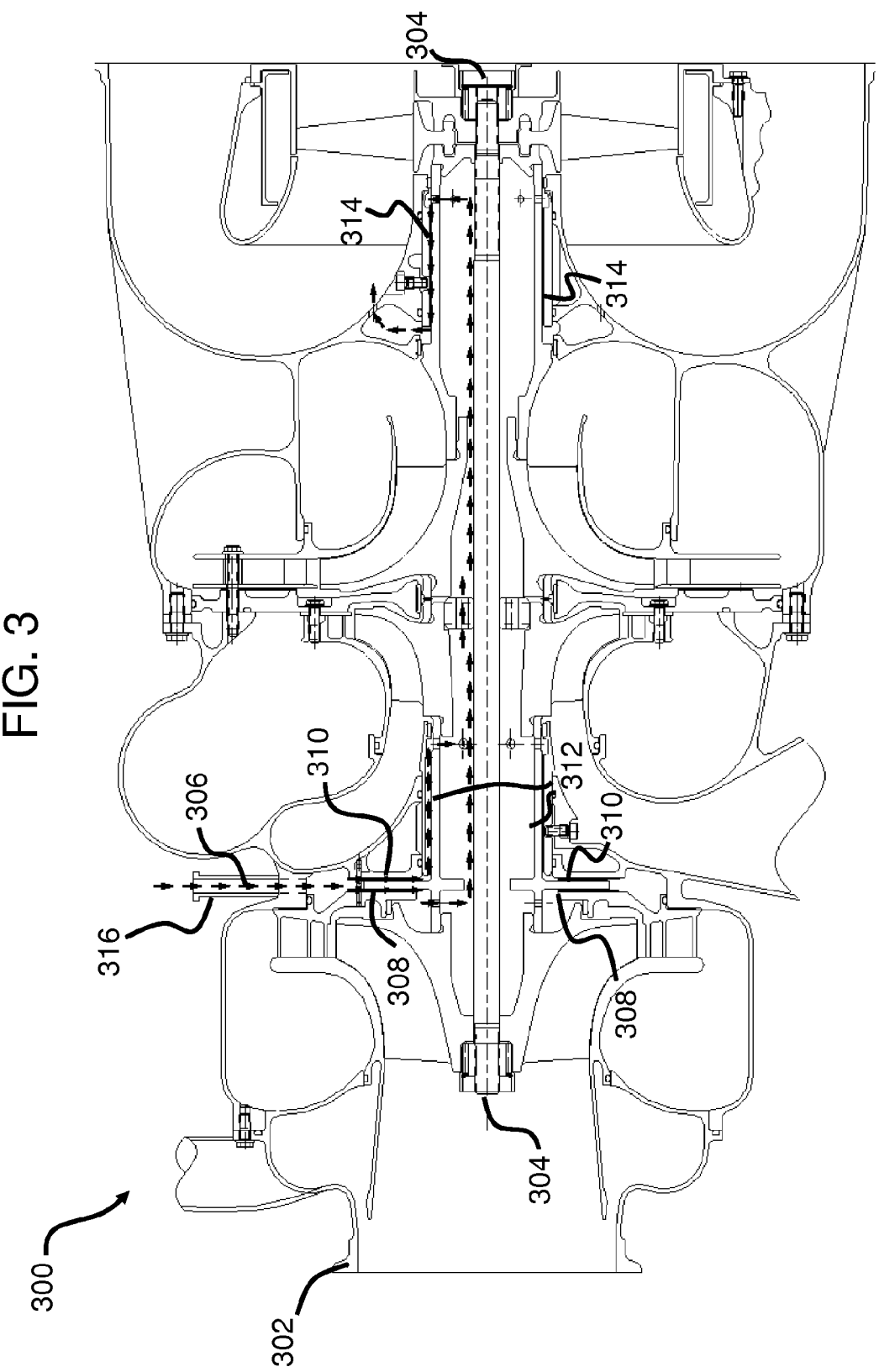
FIG. 3 is a schematic cross-sectional view of an engine including an air cycle machine in accordance with an exemplary embodiment of the invention.

Turning now to FIG. 3, an air cycle machine 300 is part of an environmental control system that is configured to supply conditioned air, for example, to a cabin of an aircraft. The air cycle machine 300 is a four-wheel air cycle machine, with four rotors on a single shaft 304. The four rotors are fixed together and are supported by bearing elements. There are, thus, four bearings configured within the air cycle machine 300 which are arranged along an airflow passage 306, which is represented by the path of arrows in FIG. 3. The air flow passage 306 provides air as both a lubricating fluid for the hydrodynamic bearings and as a cooling air flow to remove heat generated by the bearings during operation. Although described herein as a four-wheel air cycle machine, this is presented for illustrative and explanatory purposes, and other air cycle machines or other device/configurations may be used without departing from the scope of the invention, such as, for example, three-wheel air cycle machines.

In the exemplary configuration of FIG. 3, two of the four bearings are thrust bearings and two are journal bearings. The thrust bearings are located at the inlet side of the airflow passage 306 and the journal bearings located further downstream in the airflow passage 306. A first thrust bearing 308 is configured as an outboard thrust bearing and a second thrust bearing 310 is configured as an inboard thrust bearing. After the thrust bearings 308 and 310, in the direction of the airflow passage 306, a first journal bearing 312 is configured as a turbine journal bearing and then, toward the outlet of the airflow passage 306, a second journal bearing 314 is configured as a fan journal bearing. The thrust bearings 308, 310 are configured to operate with axial loads, and the journal bearings 312, 314 are configured to operate with radial loads within the engine 302.

As a non-limiting example, the air cycle machine 300 may operate at 20,000-50,000 RPM. However, other rotational speeds of operation may be used without departing from the scope of the invention. As such, during operation, each of the bearings 308, 310, 312, 314 will generate heat due to viscous shear of the hydrodynamically generated film of air between the bearing top foil and the rotating shaft which can lead to structural failure of the bearings. To dissipate the heat, air flows through airflow passage 306 and passes over the bearings 308, 310, 312, 314 to provide a cooling factor through and/or over the bearings. The supply of cooling air impacts the efficiency of the entire system, such as the power and efficiency of an aircraft. Thus, providing an efficient supply, both in terms of air temperature/pressure and demands on the system, is beneficial.

The cooling air in airflow passage 306 is supplied from a cooling air inlet 316. Traditionally, the inlet 316 is fluidly connected to a single air supply source, which is usually a single, high pressure, cool temperature source (not shown). For example, the traditional source may be a turbine air flow that supplies bleed air.

Figure 4:
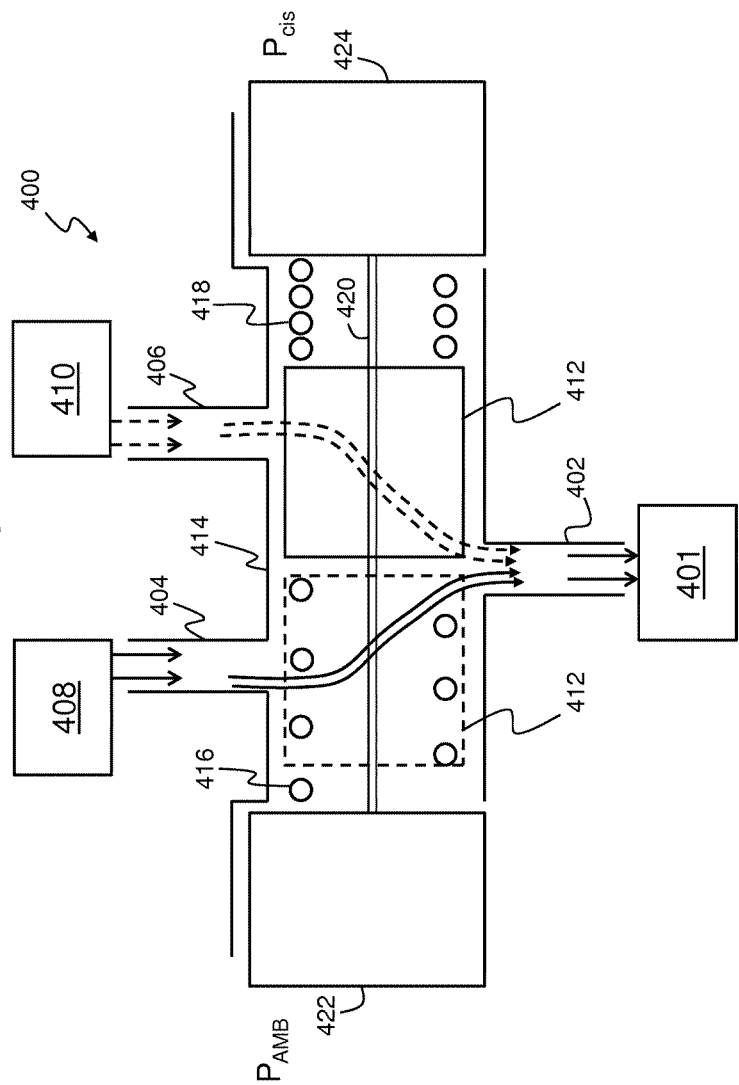
FIG. 4 is a schematic of an air cycle machine cooling supply controller in accordance with an exemplary embodiment of the invention.

Turning now to FIG. 4, an exemplary cooling air flow control system in accordance with the invention is shown. Cooling airflow control system 400 fluidly connected to a cooling airflow passage of an air cycle machine 401, e.g., fluidly connected to air passage 306 of FIG. 3. Thus, the cooling airflow control system 400 fluidly connects to the air cycle machine 401 by means of an outlet 402, which may be the same as air cycle machine inlet 316 of FIG. 3, or fluidly connected thereto by intermediate channels, pathways, etc.

The cooling airflow control system 400 may have two airflow inlets, which may be selectively controlled or opened to determine a fluid airflow supply to the air cycle machine 401. For example, as shown in FIG. 4, the cooling airflow control system 400 includes a first inlet 404 and a second inlet 406. The first inlet 404 is fluidly connected to a first source 408, such as a bleed line of a turbine, such that the air cycle machine 401 may be supplied with air from the first source 408. The second inlet 406 may be fluidly connected to a second source 410, such as a pressure compressor, such that the air cycle machine 401 may be supplied with air from the second source 410. For example, if the second source is configured as a pressure compressor, the air supplied to the air cycle machine 401 will be pre-treated, e.g., compressed and/or thermally treated, prior to entering the airflow passage of the air cycle machine 401.

Figure 5:
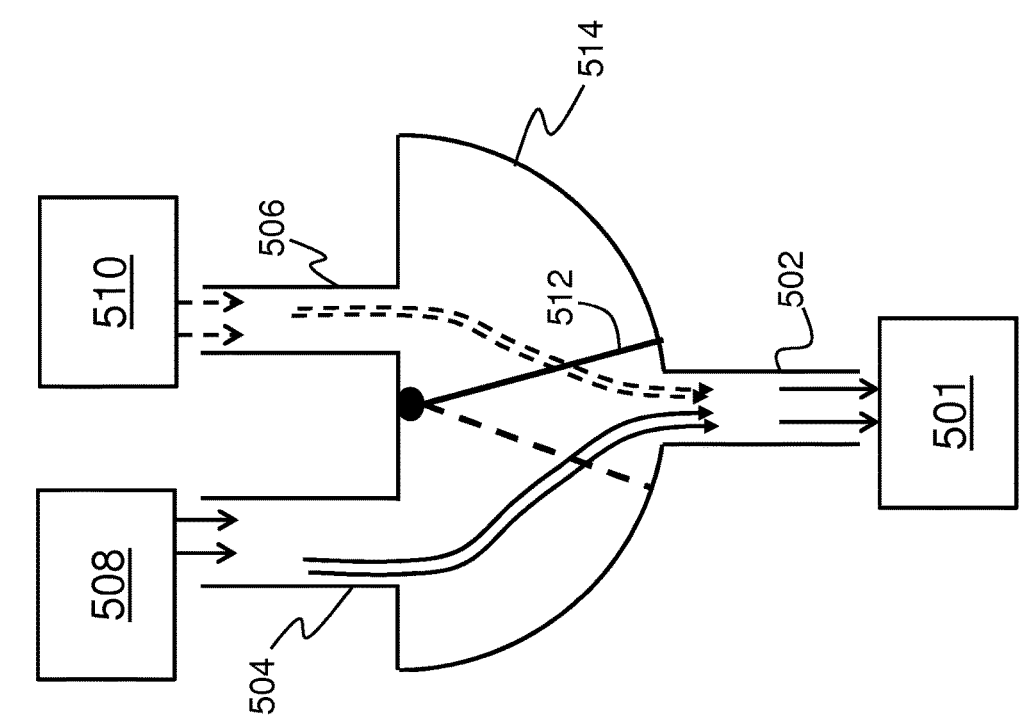
FIG. 5 is a schematic of an air cycle machine cooling supply controller in accordance with an alternative exemplary embodiment of the invention.

The airflow supply to the air cycle machine 401 is controlled, in part, by a control member 412. The control member 412 is configured to block, prevent, suppress, stop, or otherwise impede airflow, at least partially, from one or both of the two inlets 404, 406 of the cooling airflow control system 400. The control member 412, as shown in FIG. 4, is configured as a sliding seal or other sealing device. In some such embodiments, the control member 412 is configured as a poppet, plug, or stopper (e.g., as shown in FIG. 4), and in other embodiments, the control member may be configured as a flap valve or valve-type configuration (e.g., as shown in FIG. 5). Those of skill in the art will appreciate that other types of control members may be employed without departing from the scope of the invention, and the embodiments described herein are provided for illustrative and explanatory purposes only. In some embodiments, as shown in FIG. 4, the control member 412 is movably or slidably engaged within a chamber 414. The control member 412 is movable between at least a first position and a second position within the chamber 414.

In the first position, the control member 412 may block or prevent airflow from the second source 410 and permit airflow from the first source 408 to the air cycle machine 401, through a portion of the chamber 414. The first position is shown, for example, as the solid line representation of the control member 412, with the airflow through the cooling airflow control system 400 shown in solid line arrows.

In the second position, the control member 412 may block or prevent airflow from the first source 408 and permit airflow from the second source 410 to the air cycle machine 401, through a portion of the chamber 414. The second position is shown, for example, as the dashed line representation of the control member 412, with the airflow through the cooling airflow control system 400 shown in dashed line arrows.

The control member 412 is movable from the first position to the second position and/or from the second position to the first position, in part, by one or more springs or other type of actuating and/or biasing device(s) 416, 418. The control member 412 is guided within the chamber 414 by a guide 420, which may be a tie rod or other similar device.

The biasing members 416, 418 are configured to compress and/or expand based on a relative pressure, which determines which airflow supply (first source 408 or second source 410) will be used for cooling the bearings of air cycle machine 401. As such, the biasing members 416, 418 may have different spring forces and the control member 412 may be moved within the chamber 414 based on the compression/extension of the biasing members 416, 418.

For example, a control pressure $P_{control}$ may be predetermined such that a first biasing member 416 is extended or expanded and a second biasing member 418 is compressed, in the presence of the control pressure $P_{control}$. That is, when a pressure of the air within the cooling airflow control system 400 is equal to the control pressure $P_{control}$, the control member 412 is in the first position. As noted, in the first position (solid line representation), airflow flows from the turbine 408 to the air cycle machine 401.

The control pressure $P_{control}$ may be set such that the pressure is equal to ambient pressure $P_{amb}$ when an aircraft is on the ground, thus $P_{control}=P_{amb}$. This is controlled, in part, by a first block 422, which may support the first biasing element 416. Air flow with ambient pressure $P_{amb}$ is supplied from the first source 408, which, for example, pulls air from outside the aircraft, through a turbine, and a portion of the air is bled to the first inlet 404. In this example, supply from the first source 408 occurs when the aircraft is on the ground and/or at low altitudes. However, as the aircraft attains higher altitudes, the outside air pressure drops and lowers in temperature.

To provide efficient use of power and airflows, air compressors are employed in the aircraft. The compressors will compress the incoming air to a compressor pressure $P_{cis}$. A portion of the compressor-supplied air having compressor pressure $P_{cis}$ will be fed into the second inlet 406 from the second source 410. When the pressure of the air in the inlet 406 ($P_{cis}$) exceeds the air pressure of the air supplied from the first source 408 in the first inlet 404 ($P_{amb}$), the spring force of the first biasing member 416 will be exceeded, and the first biasing member 416 will compress. As the first biasing member 416 compresses, the control member 412 will slide along guide 420 from the first position toward the second position (dashed lines shown in FIG. 4), within the chamber 414. At the same time, the second biasing member 418 will expand from a second block 424.

In some embodiments, first and second blocks 422, 424 may be configured as pistons or be piston-like. Thus, in some embodiments, the air pressure ($P_{AMB}$ or $P_{cis}$) may act as a driving force against the first and second blocks 422, 424 to move the control member 412 via the guide 420, which operably connects the two blocks 422, 424 and the control member 412, as shown in FIG. 4.

When the aircraft then descends, and the air pressure changes, the air supplied from the first source 408 at pressure $P_{amb}$ will exceed the pressure $P_{cis}$ of the air supplied from the second source 410, and $P_{amb}$ will approach $P_{control}$ which will force the first biasing member 416 to expand and the second biasing member 418 to compress, thus returning the control member 412 to the first position (solid lines in FIG. 4).

In some embodiments, the first biasing member 416 may be fixedly connected or attached to one or both of the first block 422 and the control member 412 and the second biasing member 418 may be fixedly connected or attached to one or both of the second block 424 and the control member 412. Further, in some embodiments, the guide 420 may be fixedly connected or attached to one or both of the first block 422 and the second block 424.

Thus, in some, the control member 412 configuration enables a passive controlling of the air supply source to an air cycle machine 401.

Turning now to FIG. 5, alternative exemplary embodiment of the invention is shown. Various elements of FIG. 5 are substantially similar to various elements of the embodiment of FIG. 4, and thus like features are numbered the same but with a "5" preceding the number rather than a "4."

The primary difference between the embodiments of FIG. 4 and FIG. 5 is the configuration of the control member 512. In FIG. 5, control member 512 is configured as a flap valve. The control member 512 may have a elasticity or other characteristic that enables change from the first position (solid line) to a second position (dashed line). In the embodiment of FIG. 5, because the configuration of the control member 512 is different, the chamber 514 is similarly changed to accommodate the operation of the cooling airflow control system 500. In some embodiments, the control member 512 may be configured on a hinge or similar structure that is configured to enable changing from the first position to the second position based on the relative pressure differences between the air supplied by the first source 508 and the second source 510.

Although the embodiments of FIGS. 4 and 5 have been described with respect to passive control systems, an active control system may be employed without departing from the scope of the invention. For example, with reference to FIGS. 4 and 5, a computer or other type of electronic or mechanical controller, hereinafter referred to as a processor, can be operationally connected or in communication with the control member 412, 512. The processor can be configured with algorithms, programs, programming, etc. that operationally controls the supply source of cooling air flow for the bearings of the air cycle machine. Further, in some embodiment, a mechanical controller may be used, wherein a sensing of comparative pressures is determined, and a selection of the supply air source is made. Thus, various other embodiments that are active may be used without departing from the scope of the invention.

Advantageously, in some embodiments, a simple control member, such as a spring/poppet control design with no actuators, motors, or other types of controls are required to efficiently supply cooling air to an air cycle machine. Further, in some embodiments, controllers, motors, or other types of controls may be used.

Advantageously, when employed on an aircraft, the system disclosed herein takes advantage of low bleed temperatures associated with environmental control systems. For example, the compressor of an environment control system may provide inlet air temperatures that are sufficient for cooling bearings of an air cycle machine. Further, when in flight, efficiency may be gained by tapping off cooling flow prior to performing work on the air in the air cycle machine, e.g., heat transfer in a heat exchanger. Furthermore, because the sourcing inlet sizes of traditional turbine supplies are optimized for ground cooling, using a second inlet source (such as a compressor) reduces the cooling flow tapped during flight.

Further, advantageously, embodiments of the invention enable a reduction of engine bleed tap-off from the air conditioning system while in flight, thus increasing engine efficiency and reducing fuel burn. Further, tapping off cooling air within the air conditioning system prior to passing through the compressor and primary heat exchanger improve the air cycle machine and heat exchanger efficiencies, which enables a reduction in size requirements and corresponding weight of both elements. Further, the increased efficiency provided and enabled by embodiments of the invention provide a domino effect by further improving engine efficiency and fuel burn because less bleed flow is tapped off the engine. Similarly, another domino effect is a reduced aircraft weight which results in a reduction in fuel burn.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

Further, for example, although described herein as first and second sources being a turbine and a compressor, those of skill in the art will appreciate that other configurations are possible without departing from the scope of the invention.

Accordingly, the invention is not to be seen as limited by the foregoing description, but is only limited by the scope of the appended claims.

The invention claimed is:

1. An air supply controller configured to supply cooling air to an air cycle machine, comprising:
   a chamber having a first inlet configured to receive air from a first source at a first pressure, a second inlet configured to receive air from a second source at a second pressure, and an outlet configured to pass air from at least one of the first inlet and the second inlet to the air cycle machine; and
   a passive control member disposed within the chamber and movable within the chamber between a first position and a second position based on an air pressure applied to the passive control member from the first and second sources, wherein when the first pressure exceeds the second pressure the passive control member is in the first position and when the second pressure exceeds the first pressure the passive control member is urged toward the second position,
   wherein when the passive control member is in the first position the passive control member obstructs an airflow from the second inlet to the outlet and permits an airflow from the first inlet to the outlet, and when the passive control member is in the second position the passive control member obstructs the airflow from the first inlet to the outlet and permits the airflow from the second inlet to the outlet, wherein the passive control member is a sliding seal that comprises:

a control member movably mounted on a guide;

a first block supporting a first biasing element;

a second block supporting a second biasing element, wherein the guide extends between the first block and the second block; and the control member is positioned between the first block and the second block, wherein movement of the control member is controlled by the first biasing element, the second biasing element, the first pressure, and the second pressure.

2. The air supply controller of claim 1, wherein the first biasing element and the second biasing element are configured to at least one of (i) urge the passive control member from the first position to the second position and (ii) urge the passive control member from the second position to the first position.

3. The air supply controller of claim 2, wherein the biasing are springs.

4. The air supply controller of claim 1, wherein the passive control member is a valve.

5. The air supply controller of claim 1, wherein the first source is a turbine of an aircraft and the second source is a compressor of the aircraft.

6. The air supply controller of claim 5, wherein the passive control member is in the first position when the aircraft is on the ground and wherein the passive control member is in the second position when the aircraft is at high altitude.

7. The air supply controller of claim 1, wherein the passive control member is in the first position when a pressure of air supplied from the first source exceeds a pressure of air supplied from the second source.

8. The air supply controller of claim 1, wherein the passive control member is in the first position when a pressure of air supplied from the second source is at or below a predetermined pressure.

9. The air supply controller of claim 1, wherein the passive control member is in the second position when a pressure of air supplied from the first source is less than a pressure of air supplied from the second source.

10. The air supply controller of claim 1, wherein the passive control member is in the second position when a pressure of air supplied from the second source is above a predetermined pressure.

* * * * *